Patented Nov. 11, 1947

2,430,556

UNITED STATES PATENT OFFICE 2,430,556

NATURAL OR SYNTHETIC RUBBER STABILIZED BY AN ANTIOXIDANT EXTRACTED FROM FATTY OILS

Loran O. Buxton, Maplewood, N. J., assignor to Nopco Chemical Company, Harrison, N. J., a corporation of New Jersey No Drawing. Application December 27, 1943, Serial No. 515,796

10 Claims. (Cl. 260—23)

This invention relates to the stabilization of natural and artificial rubbers, and particularly to the stabilization of such rubbers against deterioration caused by oxygen and light.

A wide variety of substances have heretofore been added to natural and artificial rubbers for the purpose of stabilizing the same against deterioration due to atmospheric oxygen and the action of light in combination with atmospheric oxygen. Most of the substances proposed have been rather costly synthetic products, some of which present definite toxicity hazards in the handling thereof. Moreover, most of these antioxidants have left much to be desired in their protection of the rubber against oxidation, and particularly against oxidation stimulated by sunlight. Another shortcoming of antioxidants heretofore proposed is their failure to prevent the phenomenon known as "after-hardening" in synthetic rubbers such as the butadiene and chloroprene polymer rubbers.

In carrying out experiments relating to the solvent extraction of fatty materials, it was discovered that by treating natural antioxidant-containing fatty materials with certain types of organic solvents, highly potent extracts containing the majority of the natural antioxidants of the fatty material concentrated therein may be obtained. Thus it has been found that a highly potent antioxidant extract may be obtained from a natural antioxidant-containing vegetable or fish oil by contacting said oil with a suitable solvent at room temperature or above, such that at least the major portion of the oil is miscible with the solvent, and then cooling the mixture to a temperature within the range of 0° C. to —70° C., whereby a solvent layer containing the desired antioxidant extract separates. Among the solvents which were found to be particularly suitable for use in this process are those listed in the table below:

TABLE I (1) Aliphatic and alicyclic monohydroxy alcohols containing from 3 to 6 carbon atoms.
(2) Esters formed by the reaction of aliphatic and alicyclic alcohols with aliphatic monocarboxylic acids, said esters containing not more than 8 carbon atoms.
(3) Aliphatic and alicyclic aldehydes containing not more than 6 carbon atoms.
(4) Aliphatic ketones containing not more than 6 carbon atoms.

It will be noted that these preferred solvents are all liquid organic compounds having the properties of being substantially miscible with fatty oils at temperatures above room temperature and partially immiscible therewith at temperatures substantially below room temperature; experiments in this connection have shown that solvents of this class may be used generally in the process hereinabove described. This process is more fully described and claimed in copending application Serial No. 351,909, filed August 8, 1940, now Patent No. 2,345,576. In accordance with this patent the following solvents may be used: n-propyl alcohol, isopropyl alcohol, n-butyl alcohol, n-amyl alcohol, isoamyl alcohol, secondary amyl alcohol, furfuryl alcohol, allyl alcohol, diacetone alcohol, β-hydroxy ethyl acetate, methyl formate, ethyl formate, ethyl acetate, methyl acetate, isopropyl acetate, glycol diformate, glycol diacetate, methyl levulinate, ethyl levulinate, methyl aceto acetate, ethyl aceto acetate, methyl furoate, vinyl acetate, furfural, propionaldehyde, crotonaldehyde, acetone, methyl ethyl ketone, acetonyl acetone and propylene chlorohydrin. It has also been found that highly potent antioxidant extracts may be obtained from natural antioxidant-containing oil-bearing solids, e. g. oil-bearing wheat germ meal, corn germ meal, soybean meal, fish meals, etc., by treating these materials with solvents by a process similar to that of application Serial No. 351,909. The latter process is more fully described and claimed in copending application Serial No. 397,547, filed June 11, 1941, now Patent No. 2,345,578. For further information concerning these processes, reference may be had to the above-identified patents.

Accordingly, it is an object of this invention to provide improved rubber compositions which are characterized by being highly resistant to oxidation.

Another object is to provide cheaper means of stabilizing rubber compositions.

Still another object is to provide antioxidants for rubber and like substances which will be non-toxic.

A further object is to protect natural and artificial rubbers against the concurrent action of oxygen and light.

A still further object is to inhibit the "after-hardening" of synthetic rubbers such as butadiene and chloroprene rubbers.

The foregoing and other objects may be achieved in accordance with this invention by the incorporation, into natural and artificial rubbers, of one or more of the antioxidant concentrates produced in accordance with the aforesaid applications Serial Nos. 351,909 and 397,547. It has been found that natural and artificial rubber compositions containing modicums of these antioxidants are efficiently protected against ordinary atmospheric oxidation. Compositions containing these antioxidants have further been found to be very successfully protected against the concurrent action of oxygen and light to a degree not attainable with any present commercial antioxidants of which the applicants are aware. Likewise, synthetic rubber compositions such as chloroprene and butadiene rubber compositions containing antioxidants as above set forth are rendered free from the phenomenon of "after-hardening."

Any of the known natural or synthetic rubbers will be stabilized against oxidative deterioration by the incorporation of antioxidants as above set forth. Examples of specific types of rubbers which may be advantageously stabilized according to this invention are natural hevea, balata, guttapercha, guayule and other biologically produced rubbers; and synthetic rubbers such as butadiene rubber, chloroprene rubber, butadiene-isobutylene rubber, butadiene-styrene rubbers, and the like. In addition, the artificial rubbers are protected against the troublesome phenomenon known as "after-hardening." The butadiene and chloroprene rubbers have hitherto been especially subject to this trouble, which is obviated in accordance with the present invention.

In the practice of this invention, the antioxidants may be incorporated into the rubber to be stabilized at any stage during the compounding thereof, these antioxidants being readily compatible with all of these substances. The amount to be incorporated will, of course, vary in accordance with the nature of the particular rubber compound to be stabilized; the character of the fatty material from which the antioxidant was derived; the specific means employed for extracting the antioxidant; and the degree of antioxidant protection required in the application for which the rubber compound is designed. In general, proportions as low as 0.1%, based on the amount of rubber or artificial rubber in the compound, will impart a definite and practical degree of antioxidant protection to the final cured product produced therefrom. Ordinarily, about 0.5% to 1.0% of antioxidant, based upon the amount of rubber or artificial rubber, will be found most practical to use. The foregoing figures are naturally merely approximate and suggestive in view of the numerous variables involved in compounding rubber compositions and accordingly the exact amount of antioxidant to be employed is best determined by preliminary small scale experiment in each particular case, bearing in mind the foregoing general rules and the specific use for which the rubber composition is destined.

Instead of being incorporated into massive rubber compositions, the antioxidants may be dispersed into natural or artificial rubber latices and, when so dispersed, serve to inhibit oxidation of the constituents of the latex. In such stabilized latices, the antioxidant will, of course, be carried through to the finished rubber articles fabricated from the latices, and will serve to protect the articles from oxidation.

In practicing this invention, it is preferred to use antioxidant concentrates produced from either soybean oil, wheat germ oil, corn germ oil, cottonseed oil, corn oil, sesame oil, peanut oil, etc., or any mixture of these and similar oils, or antioxidant fractions produced from oil-bearing wheat germ meal, corn germ meal, soybean meal, etc. It is to be understood, however, that similar antioxidant fractions prepared from any natural antioxidant-containing animal or vegetable oil or oil-bearing solid may be used.

*Preparation of antioxidant*

| | Parts |
|---|---|
| Crude soyabean oil | 66.5 |
| Isopropanol (91%): | |
| 1st portion | 218 |
| 2d portion | 206 |

The soyabean oil and first portion of the isopropanol were mixed and agitated at 50° C. for 15 minutes. An atmosphere of nitrogen was maintained above the materials during this operation. The oil-isopropanol mass was then chilled to −25° C. and kept at this temperature for 2½ days. At the end of this time, the mixture had separated into a supernatant liquid layer consisting principally of isopropanol and material extracted thereby and a solid sludge layer. The isopropanol layer and the more pourable portion of the sludge were decanted and filtered, yielding a clear isopropanol extract filtrate "A," and a solid cake.

The cake and undecanted sludge were mixed and agitated with the second portion of isopropanol in an atmosphere of nitrogen at a temperature of 50° C. for 15 minutes. The mass was then chilled to −25° C. and kept at this temperature for 2½ days. A sludge and a supernatant isopropanol extract layer formed, and the latter was decanted and filtered. The resultant filtrate was combined with the filtrate "A," and the isopropanol removed from the combined filtrate by low pressure distillation in a nitrogen atmosphere. The residue was used as an antioxidant in the practice of the invention as hereinafter detailed.

*Tests conducted on antioxidants*

| | Parts |
|---|---|
| Pale crepe rubber | 100.00 |
| Titanium oxide | 6.00 |
| Zinc oxide | 5.00 |
| Sulfur | 2.25 |
| Benzothiazyl disulfide | 1.00 |
| Tetramethyl thiuram disulfide | 0.20 |
| Antioxidant | 0.25, 0.50, 1.00 or 2.00 |

Antioxidant prepared as above described.

Di-o-tolyl ethylene diamine

Acetone-aniline condensate: A light colored powdered condensation product of acetone and aniline manufactured by Monsanto Chemical Company for use as a rubber antioxidant:
  Size: minimum of 99.5% passes through 200 mesh screen. Melting point: 120° C. minimum. Specific gravity: 1.08. Approximate solubility: 10% in benzene, 10% in ethanol, 1% in gasoline, insoluble in water.

Hydroquinone mono-benzyl ether

Substituted phenylene diamine:
  N-p-tolyl-N'-p-tolyl sulfonyl - p - phenylene diamine manufactured by Naugatuck Chemical Company for use as a rubber antioxidant.

A series of rubber compounds were made in accordance with the foregoing formula, using each of the five named antioxidants in each of the four proportions 0.25, 0.50, etc. listed, thus making 20 compounds in all. These compounds were all cured in a press at 40 pounds steam for 15 minutes. Samples of each of the cured compounds were artificially aged and tested as follows:

I. Tensile and elongation tests:
  A. Fresh sample aged for 10 hours in air at 80 pounds per sq. in. pressure and 127° C. Tensile strength and elongation at break determined on aged sample.
  B. Fresh sample aged 4 days in oxygen bomb at 80° C. and 300 pounds oxygen pressure. Tensile strength and elongation at break determined on aged sample.
  C. Fresh sample aged 7 days in an oven at 100° C. Tensile strength and elongation determined on aged sample.
II. Light-oxidation tests:
  A fresh sample was exposed to air and ultraviolet light in the standard testing machine known as the "Fadeometer" for 100 hours at 38° C.

The compositions of the samples tested and the results of the tests are tabulated herewith:

it is obvious that their resistance to light-oxidation, as indicated by the tabulated Fadeometer tests, is of a far higher order than that of the other compounds. It will be noted further that, in general, the applicant's optimum results are in most cases attained with the use of relatively small proportions, usually 0.50 or 1.00 parts, of antioxidant, with concomitant economy of materials and avoidance of upsetting the balance of the rubber compound. The same thing is not uniformly true of the rubber compounds prepared with other antioxidants.

From the foregoing general discussion and detailed examples, it will be apparent that this invention provides novel means for protecting rubber compositions against oxidative deterioration. The protection afforded in accordance with this invention is, on the average, more effective than that obtained with conventional antioxidants against simple oxidation, not promoted by light, of rubber compositions. Furthermore, rubber compositions stabilized in accordance with this

TABLE II.—TENSILE AND ELONGATION TESTS

Antioxidant

| Ageing Procedure | Parts of Antioxidant In Compound | Antioxidant Prepared as Above Described | | Acetone-Aniline Condensate | | Hydroquinone Monobenzyl Ether | | Substituted Phenylene Diamine | | Di-o-tolyl Ethylene Diamine | |
|---|---|---|---|---|---|---|---|---|---|---|---|
| | | Tensile Strength, lb./in.² | Elongation, Per cent | Tensile Strength, lb./in.² | Elongation, Per cent | Tensile Strength, lb./in.² | Elongation, Per cent | Tensile Strength, lb./in.² | Elongation, Per cent | Tensile Strength, lb./in.² | Elongation, Per cent |
| Control: No Ageing | 0.25 | 3,820 | 745 | 3,700 | *710 | 3,630 | 690 | 3,600 | 720 | *3,660 | 705 |
| | 0.50 | 3,620 | 745 | 3,680 | 675 | *3,930 | 690 | 3,550 | 685 | 3,520 | *725 |
| | 1.00 | *4,000 | *750 | *4,000 | *710 | 3,295 | 690 | 3,050 | 680 | 3,580 | 700 |
| | 2.00 | 3,950 | *750 | 3,780 | *710 | 3,500 | *700 | *3,650 | *760 | 3,500 | 720 |
| A. Air at 80 lb./in.², 127°, 10 hr. | 0.25 | 100 | 220 | *275 | *240 | 250 | 220 | 185 | 210 | 160 | *275 |
| | 0.50 | 90 | 215 | 155 | 210 | 225 | 210 | 170 | 235 | 145 | 245 |
| | 1.00 | *110 | *270 | 180 | 215 | 225 | 215 | *235 | *255 | 230 | 255 |
| | 2.00 | *110 | 230 | 200 | 235 | *285 | *250 | 200 | 235 | *245 | 270 |
| B. Oxygen at 300 lb./in.², 80° C., 4 days | 0.25 | 770 | 540 | 320 | 240 | 2,450 | 590 | *2,720 | *615 | 2,980 | 610 |
| | 0.50 | *1,370 | *590 | 520 | 320 | 2,120 | 535 | 2,450 | 605 | 2,820 | *625 |
| | 1.00 | 1,100 | 580 | *2,000 | *545 | *2,740 | 580 | 1,910 | 600 | 2,780 | 585 |
| | 2.00 | 360 | 365 | 1,670 | 540 | 2,660 | *595 | 1,970 | 585 | *3,160 | 595 |
| C. Air at 100° C., 7 days | 0.25 | 415 | 185 | 410 | 175 | 470 | 150 | 450 | 170 | 195 | 165 |
| | 0.50 | *435 | *195 | 380 | 160 | *480 | *165 | 400 | 165 | 160 | 160 |
| | 1.00 | 380 | 175 | 460 | 175 | 410 | 135 | 440 | 165 | 320 | 205 |
| | 2.00 | 400 | 185 | *465 | *180 | 450 | 130 | *470 | *185 | *345 | *215 |

TABLE III.—FADEOMETER TESTS (100 HOURS, 38° C.)

Antioxidant

| Parts of Antioxidant In Compound | Antioxidant Prepared as Above Described | | Di-o-tolyl Ethylene Diamine | | Acetone-Aniline Condensate | | Hydroquinone Monobenzyl Ether | | Substituted Phenylene Diamine | |
|---|---|---|---|---|---|---|---|---|---|---|
| | Discoloration Rating | Color, Appearance | Discoloration Rating | Color, Appearance | Discoloration Rating | Color, Appearance | Discoloration Rating | Color, Appearance | Discoloration Rating | Color, Appearance |
| 0.25 | *2 | yellow | *6 | tan, crazed | *9 | brown, crazed | *7 | tan | *10 | brown, crazed. |
| 0.50 | 3 | do | 6 | do | 10 | do | 9 | brown, crazed | 10 | Do. |
| 1.00 | 3 | light tan | 8 | brown, crazed | 10 | do | 10 | do | 10 | Do. |
| 2.00 | 3 | do | 10 | do | 10 | do | 10 | do | 10 | Do. |

The optimum results attainable by the use of the several antioxidants against the several oxidizing conditions are indicated in Tables II and III by asterisks (*) for convenient comparison. It will be noted that the best tensile strengths obtained by the anti-oxidants used in accordance with this invention are in all cases of the same order as the best tensile strengths resulting from the use of the other antioxidants under the same conditions of oxidation. Moreover, the optimum elongations obtained with antioxidants according to this invention are in practically all cases significantly greater than the optimum elongations secured with other antioxidants. With regard to the resistance of the stabilized rubber compounds of this invention, invention exhibit a much more effective resistance to the simultaneous action of light and of atmospheric oxygen such as is encountered, for instance, in light-colored rubber goods such as white side-wall tires, unpigmented drug sundries, athletic equipment, and the like. Further, the compositions of this invention involving artificial rubbers have the unique property, not heretofore developed in this class of compositions, of being free from "after-hardening" effects.

What is believed to be specifically novel and is desired to be secured by Letters Patent is:

1. A rubber composition stabilized against oxidation containing a substance selected from the group consisting of natural rubber, rubbery polymers of butadiene, and rubbery polymers of chloroprene, and an oxidation inhibiting amount of a natural antioxidant-containing material prepared by contacting a substance selected from the group consisting of crude vegetable and fish oils and vegetable and fish oil-bearing solids at a temperature above room temperature with a solvent selected from the group consisting of aliphatic and alicyclic monohydroxy alcohols containing from 3 to 6 carbon atoms, esters formed by the reaction of aliphatic and alicyclic alcohols with aliphatic monocarboxylic acids, said esters containing not more than 8 carbon atoms, aliphatic and alicyclic aldehydes containing not more than 6 carbon atoms and aliphatic ketones containing not more than 6 carbon atoms, cooling the mass to a temperature within the range of 0° C. to −70° C., whereby layers are formed, separating the solvent layer from the insoluble residue and removing the extracted natural antioxidant from the solvent.

2. A rubber composition stabilized against oxidation containing natural rubber and an oxidation inhibiting amount of a natural antioxidant-containing material prepared by contacting a substance selected from the group consisting of crude vegetable and fish oils and vegetable and fish oil-bearing solids at a temperature above room temperature with a solvent selected from the group consisting of aliphatic and alicyclic monohydroxy alcohols containing from 3 to 6 carbon atoms, esters formed by the reaction of aliphatic and alicyclic alcohols with aliphatic monocarboxylic acids, said esters containing not more than 8 carbon atoms, aliphatic and alicyclic aldehydes containing not more than 6 carbon atoms and aliphatic ketones containing not more than 6 carbon atoms, cooling the mass to a temperature within the range of 0° C. to −70° C., whereby layers are formed, separating the solvent layer from the insoluble residue and removing the extracted natural antioxidant from the solvent.

3. A rubber composition stabilized against oxidation containing butadiene rubber and an oxidation inhibiting amount of a natural antioxidant-containing material prepared by contacting a substance selected from the group consisting of crude vegetable and fish oils and vegetable and fish oil-bearing solids at a temperature above room temperature with a solvent selected from the group consisting of aliphatic and alicyclic monohydroxy alcohols containing from 3 to 6 carbon atoms, esters formed by the reaction of aliphatic and alicyclic alcohols with aliphatic monocarboxylic acids, said esters containing not more than 8 carbon atoms, aliphatic and alicyclic aldehydes containing not more than 6 carbon atoms and aliphatic ketones containing not more than 6 carbon atoms, cooling the mass to a temperature within the range of 0° C. to −70° C., whereby layers are formed, separating the solvent layer from the insoluble residue and removing the extracted natural antioxidant from the solvent.

4. A rubber composition stabilized against oxidation containing chloroprene rubber and an oxidation inhibiting amount of a natural antioxidant-containing material prepared by contacting a substance selected from the group consisting of crude vegetable and fish oils and vegetable and fish oil-bearing solids at a temperature above room temperature with a solvent selected from the group consisting of aliphatic and alicyclic monohydroxy alcohols containing from 3 to 6 carbon atoms, esters formed by the reaction of aliphatic and alicyclic alcohols with aliphatic monocarboxylic acids, said esters containing not more than 8 carbon atoms, aliphatic and alicyclic aldehydes containing not more than 6 carbon atoms and aliphatic ketones containing not more than 6 carbon atoms, cooling the mass to a temperature within the range of 0° C. to −70° C. whereby layers are formed, separating the solvent layer from the insoluble residue and removing the extracted natural antioxidant from the solvent.

5. A rubber composition stabilized against oxidation containing a substance selected from the group consisting of natural rubber, rubbery polymers of butadiene, and rubbery polymers of chloroprene, and an oxidation inhibiting amount of a natural antioxidant-containing material prepared by contacting a substance selected from the group consisting of crude vegetable and fish oils and vegetable and fish oil-bearing solids at a temperature above room temperature with isopropanol, cooling the mass to a temperature within the range of 0° C. to −70° C., whereby layers are formed, separating the isopropanol layer from the insoluble residue and removing the extracted natural antioxidant from the isopropanol.

6. A rubber composition stabilized against oxidation containing a substance selected from the group consisting of natural rubber, rubbery polymers of butadiene, and rubbery polymers of chloroprene, and an oxidation inhibiting amount of a natural antioxidant-containing material prepared by contacting crude soyabean oil at a temperature above room temperature with isopropanol, cooling the mass to a temperature within the range of 0° C. to −70° C., whereby layers are formed, separating the isopropanol layer from the insoluble residue and removing the extracted natural antioxidant from the isopropanol.

7. A rubber composition stabilized against oxidation containing a substance selected from the group consisting of natural rubber, rubbery polymers of butadiene, and rubbery polymers of chloroprene, and oxidation inhibiting amounts of a phosphatide and of a natural anti-oxidant-containing material prepared by contacting a substance selected from the group consisting of crude vegetable and fish oils and vegetable and fish oil-bearing solids at a temperature above room temperature with a solvent selected from the group consisting of aliphatic and alicyclic monohydroxy alcohols containing from 3 to 6 carbon atoms, esters formed by the reaction of aliphatic and alicyclic alcohols with aliphatic monocarboxylic acids, said esters containing not more than 8 carbon atoms, aliphatic and alicyclic aldehydes containing not more than 6 carbon atoms and aliphatic ketones containing not more than 6 carbon atoms, cooling the mass to a temperature within the range of 0° C. to −70° C., whereby layers are formed, separating the solvent layer from the insoluble residue and removing the extracted natural antioxidant from the solvent.

8. A rubber composition stabilized against oxidation containing natural rubber and an oxidation inhibiting amount of a natural antioxidant-containing substance prepared by contacting crude soyabean oil at a temperature above room temperature with isopropanol, cooling the mass to a temperature within the range of 0° C. to −70° C., whereby layers are formed, separating the isopropanol layer from the insoluble residue and removing the extracted natural antioxidant from the isopropanol.

9. A rubber composition stabilized against oxidation containing butadiene rubber and an oxidation inhibiting amount of a natural antioxidant-containing material prepared by contacting crude soyabean oil at a temperature above room temperature with isopropanol, cooling the mass to a temperature within the range of 0° C. to −70° C., whereby layers are formed, separating the isopropanol layer from the insoluble residue and removing the extracted natural antioxidant from the isopropanol.

10. A rubber composition stabilized against oxidation containing chloroprene rubber and an oxidation inhibiting amount of a natural antioxidant-containing material prepared by contacting crude soyabean oil at a temperature above room temperature with isopropanol, cooling the mass to a temperature within the range of 0° C. to −70° C., whereby layers are formed, separating the isopropanol layer from the insoluble residue and removing the extracted natural antioxidant from the isopropanol.

LORAN O. BUXTON.

REFERENCES CITED

The following references are of record in the file of this patent:

UNITED STATES PATENTS

| Number | Name | Date |
| --- | --- | --- |
| 2,345,578 | Buxton | Apr. 4, 1944 |
| 2,273,062 | Musher | Feb. 17, 1942 |